United States Patent [19]

Wisner

[11] Patent Number: 4,966,559

[45] Date of Patent: Oct. 30, 1990

[54] INTERNAL TERMINAL BLOCK FOR COMPRESSOR HERMETIC TERMINAL

[75] Inventor: Ronald R. Wisner, Adrian, Mich.

[73] Assignee: Tecumseh Products Company, Tecumseh, Mich.

[21] Appl. No.: 420,380

[22] Filed: Oct. 12, 1989

[51] Int. Cl.[5] .......................................... H01R 21/02
[52] U.S. Cl. ................................... 439/566; 174/52.3; 439/685; 439/935
[58] Field of Search ........................ 439/506, 685, 935; 174/50.61, 152 GM

[56] References Cited

U.S. PATENT DOCUMENTS

| | | | |
|---|---|---|---|
| 2,728,060 | 12/1955 | Doeg | 339/191 |
| 3,171,585 | 3/1965 | Gauss | 230/55 |
| 3,586,910 | 6/1971 | Sauber | 317/13 |
| 3,696,321 | 10/1972 | Cooper, Jr. | 339/94 A |
| 3,721,948 | 3/1973 | Brandt | 174/152 GM |
| 3,850,496 | 11/1974 | Hague | 439/685 |
| 4,059,325 | 11/1977 | Diminnie et al. | 339/94 A |
| 4,565,503 | 1/1986 | Wise | 417/372 |
| 4,611,138 | 9/1986 | Kindig et al. | 310/71 |
| 4,748,531 | 5/1988 | Ortiz | 361/24 |
| 4,753,607 | 6/1988 | Heimbrock | 439/685 X |
| 4,921,452 | 5/1990 | Dozier | 174/152 GM |

Primary Examiner—Eugene F. Desmond
Attorney, Agent, or Firm—Jeffers, Hoffman & Niewyk

[57] ABSTRACT

A terminal block assembly for connection to the interior side of an electrical hermetic terminal of a hermetic compressor is disclosed. The hermetic terminal comprises a cup-shaped metallic body member having a plurality of conductor pins which extend through spaced apertures in the body member and are hermetically secured thereto by means of a glass insulating material. A cylindrical open end of the cup-shaped body member is exposed to the interior of the housing. The terminal block assembly comprises a main body member and a lid member. The main body member includes a cylindrical side wall portion that fits snugly within the open end of the terminal body member. The conductor pins extend through apertures in a round bottom wall of the main body member into partitioned channels in which the conductor pins are electrically connected to respective wire conductors. The lid member interlocks with the main body member to cover the partitioned channels.

20 Claims, 3 Drawing Sheets

INTERNAL TERMINAL BLOCK FOR COMPRESSOR HERMETIC TERMINAL

BACKGROUND OF THE INVENTION

The present invention relates generally to hermetic compressors of the type having a hermetic housing, wherein a hermetic terminal is provided for carrying electrical current into the housing. More particularly, the present invention pertains to a terminal block assembly for making an electrical connection to the hermetic terminal on the interior of the housing.

Generally, a hermetic electrical terminal is installed in an opening in the housing of a hermetic compressor so that current may be carried to the compressor motor from an external power source. The terminal typically comprises a cup-shaped metallic body member and a plurality of conductor pins which extend through spaced apertures in the body member and are hermetically secured thereto by means of an insulating material. The hermetic terminal is inserted into the opening in the compressor housing with the open end of the body member facing the interior of the housing. The side walls of the body member are then hermetically attached to the housing, as by welding.

When a hermetic compressor having the aforementioned hermetic terminal is operably incorporated within a refrigeration system, metallic particles that may be suspended in the refrigerant fluid are attracted to the terminal, i.e., the surface of the insulating material, by a phenomenon known as electrophoresis. In some instances, an accumulation of the metallic particles on the surface of the insulating material establishes a conductive path, e.g., a short circuit or a ground fault, that may ultimately result in failure of the hermetic terminal.

Other contaminants within the refrigeration system, such as moisture and acidic components resulting from partial decomposition of the refrigerant fluid, are capable of attacking the surface of the insulating material of the hermetic terminal, thereby causing or contributing to electrical breakdown and failure of the terminal. In the event of a compressor motor failure accompanied by high temperatures within the compressor housing, a carbon mixture deposits on the inside of the hermetic terminal to form a conductive path that short-circuits or establishes a ground fault for the conductor pins of the hermetic terminal.

Prior art attempts have been made to shield the conductor pins of a compressor hermetic terminal from contaminants by providing a planar shield member to fit over the conductor pins and cover the open end of the terminal body member prior to making electrical connection with the conductor pins. A problem with some shields is that contaminants can still accumulate on the shield and establish undesirable conductive paths.

Some prior art connectors for making an electrical connection to the conductor pins of a hermetic terminal on the interior of the compressor housing generally have not been effective in protecting the terminal from contaminants or minimizing the dangers associated with failure of the hermetic terminal. Specifically, some prior art connector plugs and terminal block assemblies may not adequately isolate the interior open end of the cup-shaped body member from the environment within the compressor housing.

The present invention is directed to overcoming the aforementioned problems associated with electrical hermetic terminals for hermetic compressors, wherein it is desired to protect the pin-retaining insulating material from contaminants that may lead to failure of the terminal, and to minimize the damage resulting from such terminal failure should it occur.

SUMMARY OF THE INVENTION

The present invention overcomes the problems and disadvantages of the above-described prior art electrical hermetic terminals and connectors by providing an improved terminal block assembly for connection to the interior side of a hermetic terminal, wherein the terminal block assembly effectively isolates the open end of the cup-shaped body member from the environment within the compressor housing.

Generally, the present invention provides a hermetic compressor having a hermetic terminal for carrying electric current into the housing, including a terminal block assembly that operably engages the hermetic terminal on the interior of the housing. The hermetic terminal includes a cup-shaped body member having an open end exposed to the interior of the housing. In accordance with a primary aspect of the present invention, a radially outwardly facing cylindrical surface of the terminal block assembly engages a radially inwardly facing cylindrical surface of the cup-shaped body member, whereby an annular sealing interface is established therebetween and the open end of the body member is protected from the interior of the housing.

More specifically, the present invention provides, in one form thereof, a terminal block assembly for engagement with a hermetic terminal on the interior of the housing of a hermetic compressor, wherein the terminal comprises a cup-shaped body member having a bottom wall and a cylindrical side wall forming an open end exposed to the interior of the housing. The terminal block assembly includes a generally cylindrical shield wall closed at one end by a barrier wall. The open end of the shield wall is telescopingly received within the open end of the cup-shaped body member such that an outside cylindrical surface of the shield wall sealingly engages an inwardly facing cylindrical surface of the cylindrical side wall of the hermetic terminal. The cylindrical shield wall and the barrier wall of the terminal block assembly effectively isolate the bottom wall of the cup-shaped body member from the interior of the housing. Conductor pins associated with the hermetic terminal pass through apertures in the barrier wall and are then connected to the compressor motor by terminal connector clips and wire leads.

An advantage of the terminal block assembly of the present invention is that the insulating material of the hermetic terminal that is exposed to the interior of the compressor housing is effectively shielded from metallic particles and the like, thereby preventing unintentional conductive paths such as ground faults or short circuits that might result in failure of the hermetic terminal.

Another advantage of the terminal block assembly of the present invention is that, in the event of a terminal failure, discharge of pressurized oil and refrigerant from the housing is restricted considerably.

A further advantage of the terminal block assembly of the present invention, in one form thereof, is the use of a two-piece body construction to facilitate easy manufacture, assembly, and disassembly of the terminal block assembly.

Yet another advantage of the terminal block assembly of the present invention is that, in the event of a motor failure within the housing, the insulating material of the hermetic terminal is effectively isolated from any carbon residue that might otherwise deposit thereon and cause a terminal failure.

A still further advantage of the terminal block assembly of the present invention, according to one form thereof, is that separate isolated compartments are provided for protection of the interior open end of the hermetic terminal and for electrical connection to the conductor pins of the terminal.

The invention, in one form thereof, provides a hermetic compressor including a housing having an opening therein and an electric motor operatively disposed within the housing. A hermetic terminal is provided for carrying electric current into the interior of the housing. The terminal includes a cup-shaped body member having a bottom wall and a generally cylindrical side wall extending upwardly from the bottom wall to form an open end of the body member. A plurality of conductor pins pass through the bottom wall of the body member. The body member is disposed in the opening of the housing such that the open end of the body member is exposed to the interior of the housing. A terminal block is provided for electrically connecting the motor to the plurality of conductor pins. The terminal block includes a shield for substantially isolating the open end of the body member from the interior of the housing. Specifically, the shield includes an outwardly facing cylindrical surface in contacting engagement with an inwardly facing cylindrical surface of the cylindrical side wall of the body member. The engagement of the outwardly and inwardly facing cylindrical surfaces establishes an annular sealing interface therebetween.

The invention further provides, in one form thereof a hermetic compressor including a housing having an opening therein, and an electric motor operatively disposed within the housing. A hermetic terminal for carrying electric current into the interior of the housing is provided, wherein the terminal includes a cup-shaped body member. The body member includes a bottom wall and a generally cylindrical side wall extending upwardly therefrom to form an open end of the body member. A plurality of conductor pins sealingly pass through the bottom wall of the body member. The body member is disposed in the opening of the housing such that the open end of the body member is exposed to the interior of the housing. A terminal block is provided which electrically connects the motor to the plurality of conductor pins. The terminal block comprises a cylindrical wall portion having an open end that is telescopingly received within the side wall of the body member to establish an annular sealing interface between an inwardly facing cylindrical surface of the side wall and an outwardly facing cylindrical surface of the wall portion. The terminal block also includes a barrier wall which closes the cylindrical wall portion at an end opposite the open end thereof. The barrier wall has an inside surface facing the bottom wall of the body member and an outside surface facing the interior of the housing. The barrier wall includes a plurality of apertures corresponding to the plurality of conductor pins, wherein each conductor pin passes through a respective aperture and extends outwardly from the outside surface of the barrier wall. The electric motor is electrically connected to the conductor pins adjacent the outside surface of the barrier wall.

DESCRIPTION OF THE PREFERRED EMBODIMENT

Figure 1:
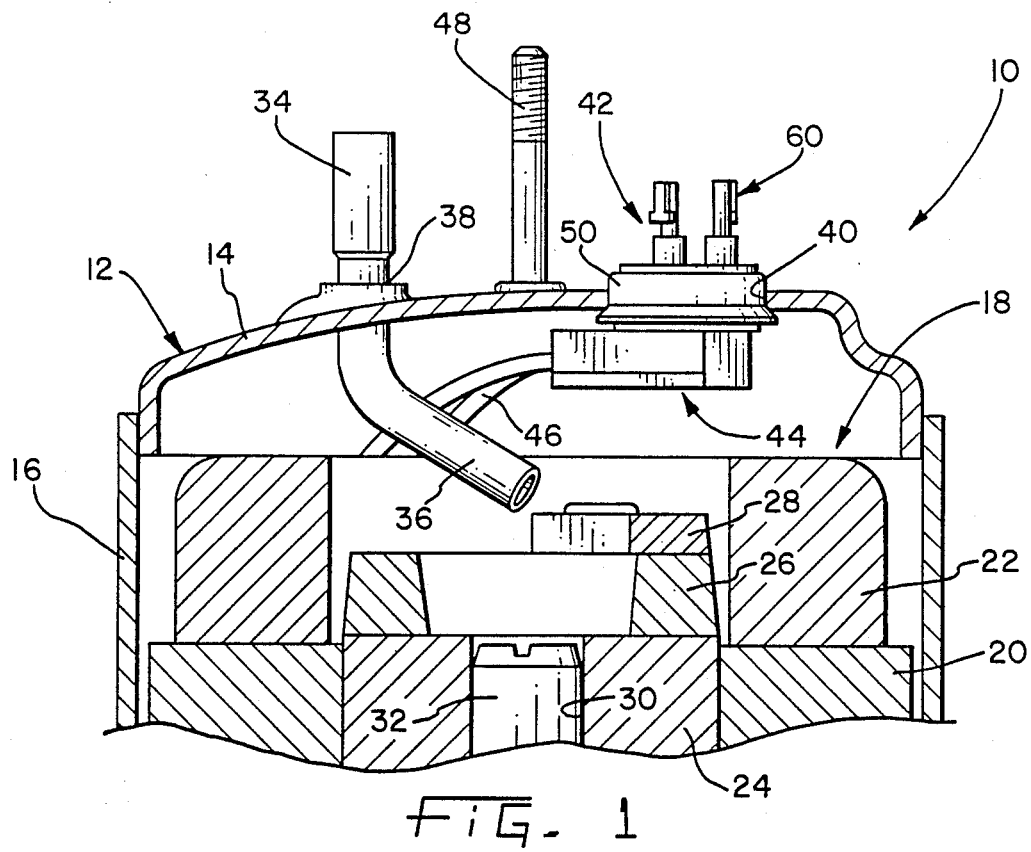
FIG. 1 is a fragmentary longitudinal sectional view of a compressor of the type to which the present invention pertains.

In an exemplary embodiment of the invention as shown in the drawings, and in particular by referring to FIG. 1, a hermetic compressor 10 is shown having a housing generally designated at 12. Housing 12 comprises a top portion 14, a central portion 16, and a lower portion (not shown). The three housing portions are hermetically secured together as by welding or brazing. Disposed within housing 12 is an electric motor generally designated at 18. Motor 18 comprises a stator 20 having windings 22, and a rotor 24 having an end cap 26 to which a counterweight 28 is attached. The stator is secured to housing 12 by an interference fit such as by shrink fitting.

Rotor 24 has a central aperture 30 provided therein into which is secured a rotatable crankshaft 32 by an interference fit. Crankshaft 32 is drivingly connected to a compressor mechanism (not shown), e.g., a reciprocating piston or rotary vane compressor, which compresses refrigerant for discharge into the interior of housing 12. A refrigerant discharge tube 34 extends through top portion 14 of the housing and has an end 36 thereof extending into the interior of the compressor housing as shown. The tube is sealingly connected to housing 12 at 38, as by soldering.

Top portion 14 includes an opening 40 in which is provided a hermetic terminal assembly 42 for carrying electrical current from outside of housing 12 to motor 18 when compressor 10 is operably connected to an external power source (not shown). A terminal block assembly 44, in accordance with the present invention, connects to terminal assembly 42 on the interior of the housing and carries current to stator windings 22 through wire leads 46. Compressor 10 also includes a post 48 welded to top portion 14 for mounting a terminal cover (not shown) to cover terminal assembly 42 once compressor 10 is operably installed.

Figure 2:
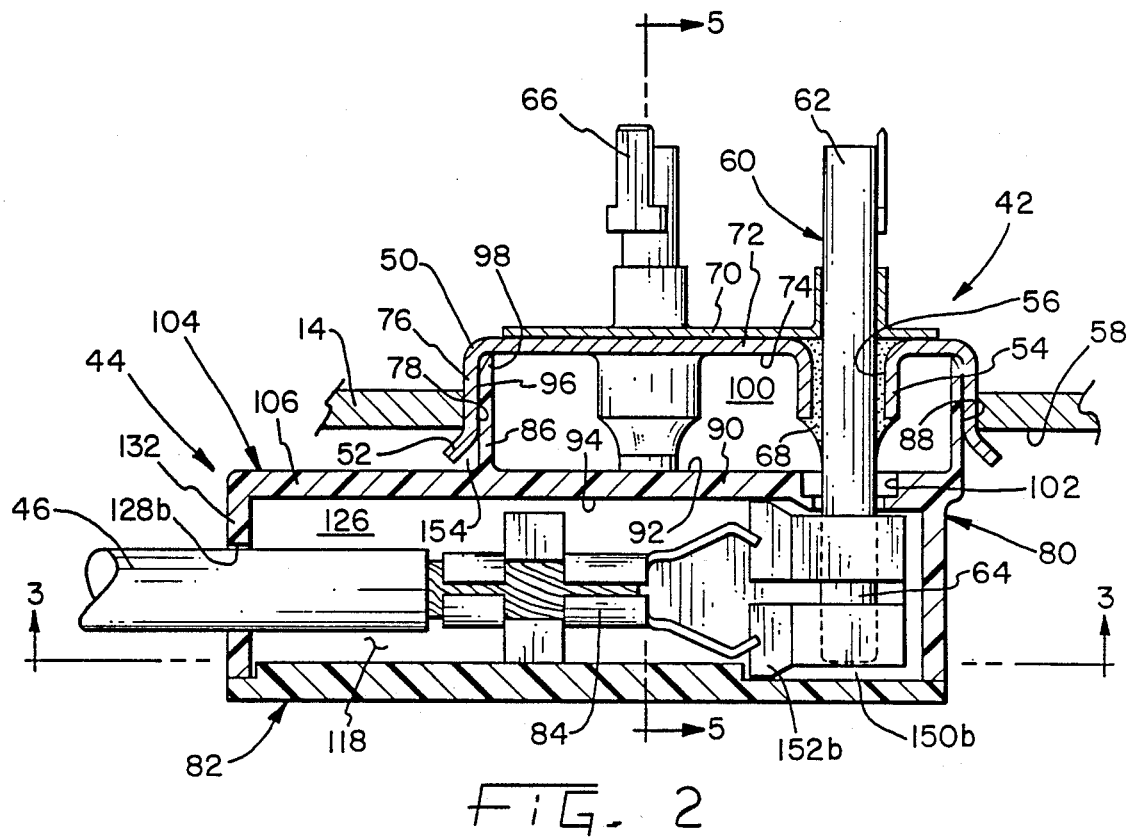
FIG. 2 is an enlarged fragmentary sectional view of a portion of the compressor of FIG. 1, particularly showing a terminal block assembly operably engaged with the hermetic electric terminal in accordance with the present invention.

Referring now to FIG. 1 and 2, terminal assembly 42 in general comprises a metallic, cup-shaped body member 50 having an annular frustoconical flange 52 and three inwardly extending collars 54 defining spaced openings 56 extending through body member 50. Flange 52 is disposed against an inner surface 58 of housing 12 when terminal assembly 42 is welded in place, thereby ensuring that the body member 50 will not be dislodged by the high pressure within housing 12. Received in each of the collars 54 is a metallic conductor pin 60 made of suitable conducting material, such as stainless steel, copper, or copper core stainless steel. Conductor pins 60 are preferably of integral construction, each having an upwardly extending portion 62 on the outside of the housing 12 for connection to an external source of power, and a downwardly extending portion 64 on the interior of the housing for connection to terminal block assembly 44. A tab 66 is secured to the distal end of each portion 62 in order to facilitate the attachment of connecting leads (not shown).

Figure 3:
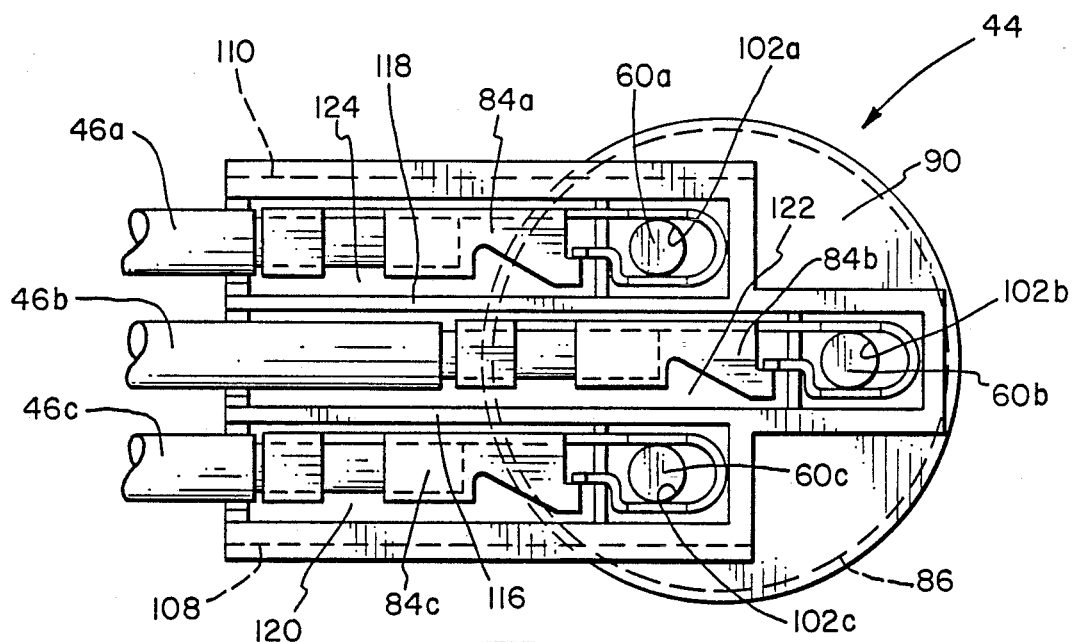
FIG. 3 is a sectional view of the terminal block assembly of FIG. 2, taken along the line 3—3 in FIG. 2 and viewed in the direction of the arrows, effectively illustrating the terminal block assembly with the cover portion removed.

Each conductor pin 60 is retained within an opening 56, and is spaced from a collar 54 by an insulating material 68, such as glass, epoxy, or some other suitable material. Also, the external surface of body member 50 is coated with a suitable protective layer 70, such as epoxy or rubber, which extends partially along pin portions 62, as shown in the drawings. As best illustrated in FIGS. 2 and 3, conductor pins 60 are circularly arranged about a central axis extending generally normal to the outside surface of housing 12. Portions 64 of conductor pins 60 extend axially downwardly, parallel to one another and to the aforementioned central axis.

Referring to FIG. 2, cup-shaped body member 50 includes a bottom wall 72 having a round bottom surface 74, and a cylindrical side wall 76 having a radially inwardly facing cylindrical surface 78. It will be appreciated that bottom wall 72 and side wall 76 constitute an open end of body member 50 that faces the interior of housing 12 and exposes bottom surface 74 to the environment therein.

Terminal block assembly 44 will now be described in connection with the illustrated embodiment of the present invention. Generally, assembly 44 includes a main body member 80, a removable cover member 82, and three terminal connector clips 84 associated with conductor pins 60 and wire leads 46. For purposes of identification, the three respective groups of associated conductor pins, terminal connector clips, and wire leads will be designated using conductor pins 60a–c, connector clips 84a–c, and wire lead 46a–c, with associated group elements having like suffixes as best illustrated in FIG. 3.

Main body member 80, in accordance with the present invention, includes an axially extending cylindrical shield wall 86 having a radially outwardly facing cylindrical surface 88, and a barrier wall 90 connected to and closing one end of cylindrical shield wall 86. More specifically, barrier wall 90 includes a round inside surface 92 and an outside surface 94, wherein shield wall 86 extends upwardly from the perimeter of inside surface 92. As shown in FIG. 2, shield wall 86 is telescopingly received within side wall 76 by an interference fit, whereby radially outwardly facing cylindrical surface 88 and radially inwardly facing cylindrical surface 78 establish an annular cylindrical sealing interface 96 therebetween. The open end of shield wall 86 includes an inward taper 98 to facilitate easy insertion of shield wall 86 within side wall 76.

Referring once again to FIG. 2, the engagement of terminal block assembly 44 with terminal assembly 42 establishes an isolation chamber 100 defined generally by bottom wall 72 of body member 50 and shield wall 86 and barrier wall 90 of main body member 80. In this manner, bottom surface 74 and cylindrical surface 78 of body member 50 and insulating material 68 surrounding conductor pins 60 are substantially isolated from the environment within housing 12. Barrier wall 90 includes three apertures 102 through which respective conductor pins 60 extend and project upwardly from outside surface 94 for connection to a respective connector clip 84 adjacent outside surface 94, as will now be more particularly described.

Main body member 80 further includes an elongate channel portion 104 that extends axially in a direction transverse to the axis of cylindrical shield wall 86. Channel portion 104 includes a bottom channel wall 106, which at a proximal end thereof comprises a portion of barrier wall 90 and at a distal end thereof is spaced from shield wall 86. More specifically, channel portion 104 includes a pair of outer channel walls 108 and 110 that extend upwardly from bottom channel wall 106. Each channel wall includes a respective outwardly extending flange 112, 114 extending along the axial length of the channel portion. Intermediate outer channel walls 108 and 110 are two upwardly extending partition walls 116 and 118, which divide the channel portion into three partitioned channels 120, 122, and 124.

Conductor pins 60a–c extend through apertures 102a–c into partitioned channels 124, 122, and 120, respectively, as shown in FIG. 3. Connector clips 84a–c are stamped and formed in a conventional manner so as to mechanically attach to and make electrical connection with wire leads 46a–c, and push onto and be in spring-biased engagement with conductor pins 60a–c. The connector clips and associated lead wires extend axially within associated partitioned channels toward the distal end of channel portion 104, as shown in FIGS. 2 and 3.

Figure 6:
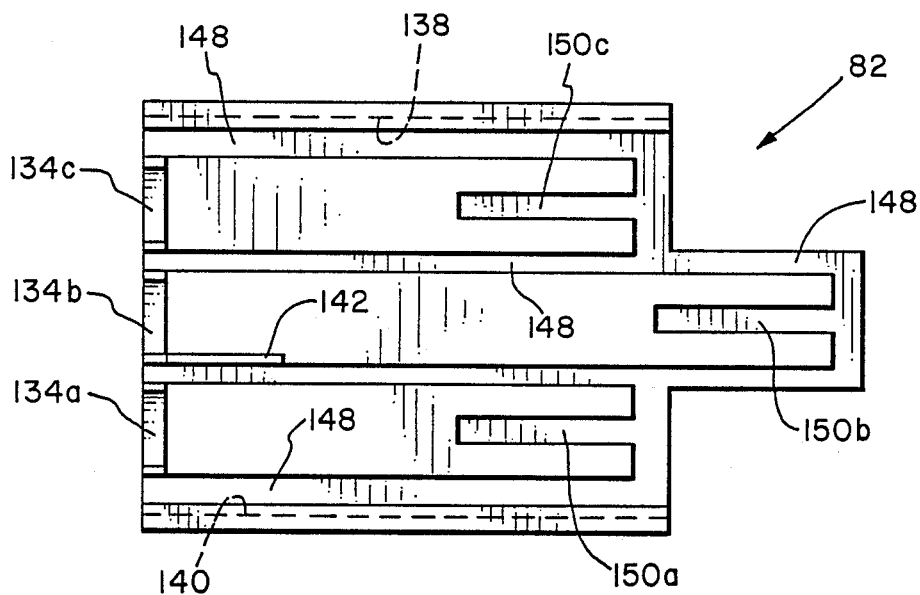
FIG. 6 is a top plan view of the lid portion of the terminal block assembly of FIG. 2.
Figure 7:
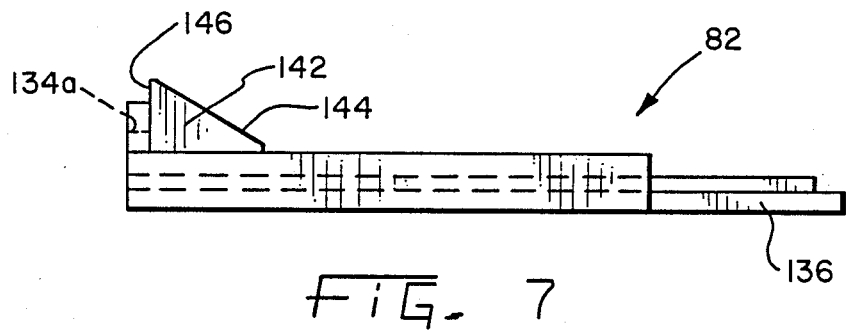
FIG. 7 is a front elevational view of the lid portion of the terminal block assembly of FIG. 2, as shown in FIG. 6.

Cover member 82, as shown in FIGS. 6 and 7, is shaped similarly to channel portion 104 and selectively covers the open channel portion when it is slidingly engaged with the channel portion to a position wherein cover member 82 is in registry with channel portion 104. When channel portion 104 is so covered, a terminal connection chamber 126 is defined in which the connector clips make connection with the conductor pins, as previously described. Wire leads 46a–c exit chamber 126 through respective wire openings 128a–c formed by semi-circular portions 130a–c in an end wall 132 of channel portion 104, and corresponding semi-circular portions 134a–c of cover member 82. In this manner, terminal connection chamber 126 remains substantially protected against the interior of housing 12. More importantly, if a terminal failure occurs, the path for fluid exiting the housing would be substantially inhibited.

Figure 4:
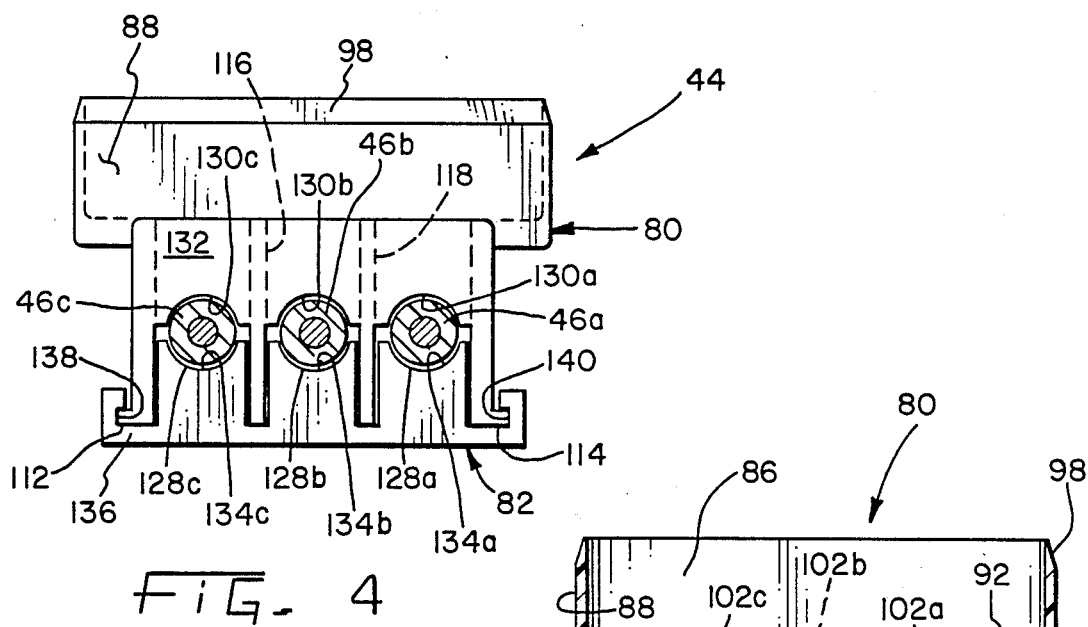
FIG. 4 is a side elevational view of the terminal block assembly of FIG. 2 as viewed from the end from which the electrical leads extend, wherein the electrical leads are shown in cross-section, particularly showing the locking engagement between the lid portion and the main body portion.
Figure 5:
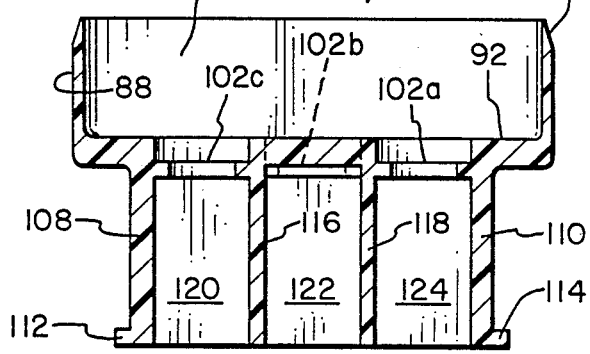
FIG. 5 is a sectional view of the main body portion of the terminal block assembly of FIG. 2, taken along the line 5—5 in FIG. 2 and viewed in the direction of the arrows.

Referring once again to FIGS. 4, 6, and 7, cover member 82 includes an elongate planar portion 136 and a pair of inwardly facing axially extending grooves 138 and 140 on the sides thereof. Grooves 138 and 140 cooperatively interfit with flanges 112 and 114 to permit cover member 82 to slide axially with respect to main body member 80. Cover member 82 includes a locking member 142 which extends perpendicularly from planar portion 136 and includes a ramp portion 144 and a stop portion 146. When cover member 82 is slidingly engaged with main body member 80 and is moved axially from the distal end of the channel portion toward shield wall 86, ramp portion 144 slides along end wall 132 until the locking member snaps into the channel and stop portion 146 engages the end wall, whereby the cover member is in registry with the channel portion and axial movement of the cover member is prevented.

Cover member 82 also includes a recessed groove network 148 corresponding to the upper edges of outer channel walls 108 and 110 and partition walls 116 and 118, wherein the upper edges of these walls are received within groove network 148 to maintain the cover member in proper registry with the main body portion. Portions 150a–c are provided in groove network 148 to receive respective tang portions 152a–c of connector clips 84a–c, respectively, as illustrated in FIG. 2 with respect to groove portion 150b and tang portion 152b. In this manner, the connector clips may be retained in proper registry with apertures 102a–c once cover member 82 is in place, i.e., by preventing axial movement of the connector clip and wire lead assemblies within the partitioned channels.

Terminal block assembly 44 is operably engaged with terminal assembly 42 by aligning conductor pins 60a–c with apertures 102a–c, and then moving the terminal block assembly towards the terminal assembly so the cylindrical shield wall 86 is coaxially received within cylindrical side wall 76 of body member 50. While a friction fit is made between shield wall 86 and side wall 76, the primary force for retention of the terminal block assembly in engagement with the terminal assembly is the frictional force between the spring-biased connector clips 84a–c and the conductor pins 60a–c.

During operation of the compressor, it has been found that foreign particles will tend to deposit in an annular groove defined by frustoconical flange portion 52 and shield wall 86, as shown in FIG. 1. However, such a deposit of foreign particles at this location will not produce any conductive path capable of producing a ground fault or short circuit.

It will be appreciated that main body member 80 and cover member 82 are preferably injection molded using Hytrel #7246 thermoplastic molding composition, as manufactured by E. I. duPont de Nemours & Co. However, other suitable thermoplastic molding compositions and materials may be used without departing from the spirit or scope of the present invention. Also, terminal connector clips 84a–c are manufactured by a stamping and forming process, preferably using 0.02 inch thick phosphor bronze sheet stock that has a 0.00006 inch thick tin plating.

While the terminal block assembly of the disclosed embodiment is intended to be assembled prior to engagement with the hermetic terminal, it will be appreciated that one could also assemble it while the connection is being made, i.e., the main body member first, the connector clip and wire lead assemblies next, and then the cover member.

It will be appreciated that the foregoing description of a preferred embodiment of the invention is presented by way of illustration only and not by way of any limitation, and that various alternatives and modifications may be made to the illustrated embodiment without departing from the spirit and scope of the invention.

What is claimed is:

1. A hermetic compressor, comprising:
   a housing having an opening therein;
   an electric motor operatively disposed within said housing;
   hermetic terminal means for carrying electric current into the interior of said housing, said terminal means including a cup-shaped body member having a bottom wall and a generally cylindrical side wall extending upwardly therefrom to form an open end of said body member, and a plurality of conductor pins passing through said bottom wall of said body member, said body member being disposed in said opening of said housing such that said open end of said body member is exposed to the interior of said housing; and
   terminal block means for electrically connecting said motor to said plurality of conductor pins, said terminal block means including shield means for substantially isolating said open end of said body member from the interior of said housing, said shield means including an outwardly facing cylindrical surface in contacting engagement with an inwardly facing cylindrical surface of said cylindrical side wall of said body member to establish an annular sealing interface therebetween.

2. The hermetic compressor of claim 1 in which:
   said shield means comprises a cylindrical wall member including said outwardly facing cylindrical surface.

3. The hermetic compressor of claim 2 in which:
   said cylindrical wall member of said shield means is frictionally engaged with said cylindrical side wall of said body member.

4. The hermetic compressor of claim 3 in which:
   said cylindrical wall member of said shield means includes a tapered axial end adjacent said bottom wall of said body member, whereby said cylindrical wall member is easily inserted within said cylindrical side wall of said body member.

5. The hermetic compressor of claim 2 in which:
   said shield means comprises a barrier wall member in spaced relationship with said bottom wall of said body member, said cylindrical wall member of said shield means being sealingly connected at a perimeter of said barrier wall member and extending toward said bottom wall in telescopic engagement with said cylindrical side wall of said body member.

6. The hermetic compressor of claim 5 in which:
   said barrier wall member includes a plurality of apertures formed therein corresponding to said plurality of conductor pins, each one of said plurality of conductor pins extending through a respective one of said plurality of apertures.

7. The hermetic compressor of claim 1 in which:
   said shield means and said body member together form a substantially closed isolation chamber in which a top surface of said body member is exposed, and said terminal block means further comprises a substantially closed terminal connector chamber into which said plurality of conductor pins extend from said isolation chamber.

8. The hermetic compressor of claim 7, and further comprising:
   a plurality of terminal connector clips disposed within said terminal connector chamber and corresponding to said plurality of conductor pins, each terminal connector clip being connected to a respective conductor pin within said terminal connector chamber.

9. The hermetic compressor of claim 7 in which:
said terminal block means includes an open channel portion and a removable cover member to selectively close said channel portion to form said terminal connector chamber.

10. A hermetic compressor, comprising:
a housing having an opening therein;
an electric motor operatively disposed within said housing;
hermetic terminal means for carrying electric current into the interior of said housing, said terminal means including a cup-shaped body member having a bottom wall and a generally cylindrical side wall extending upwardly therefrom to form an open end of said body member, and a plurality of conductor pins passing through said bottom wall of said body member, said body member being disposed in said opening of said housing such that said open end of said body member is exposed to the interior of said housing; and
terminal block means for electrically connecting said motor to said plurality of conductor pins, said terminal block means comprising:
a cylindrical wall portion having an open end adapted to be telescopingly received within said side wall of said body member to establish an annular sealing interface between an inwardly facing cylindrical surface of said side wall and an outwardly facing cylindrical surface of said wall portion;
a barrier wall closing said cylindrical wall portion at an end opposite said open end thereof, said barrier wall having an inside surface facing said bottom wall of said body member and an outside surface facing the interior of said housing, said barrier wall including a plurality of apertures corresponding to said plurality of conductor pins, each one of said plurality of conductor pins passing through a respective one of said plurality of apertures and extending outwardly from said outside surface of said barrier wall; and
connector means adjacent said outside surface of said barrier wall for electrically connecting said electric motor to said plurality of conductor pins.

11. The hermetic compressor of claim 10 in which:
said connector means comprises a plurality of terminal connector clips each connected to a respective one of said plurality of conductor pins.

12. The hermetic compressor of claim 11 in which:
said connector means comprises an open channel portion and a removable cover member to selectively close said channel portion to form a terminal connector chamber in which said plurality of connector clips connect to said plurality of conductor pins.

13. The hermetic compressor of claim 12 in which:
said connector means comprises indexing means for maintaining said plurality of connector clips in registry with said plurality of apertures, respectively, whereby said connector clips are capable of operably connecting to said conductor pins when said terminal block means is initially brought into engagement with said hermetic terminal means.

14. The hermetic compressor of claim 13 in which:
said indexing means comprises a tang portion on each of said plurality of connector clips which engages a respective slot portion formed in said cover member.

15. In a hermetic motor-compressor unit including an outer housing having an opening therein in which a hermetic terminal is mounted to provide an electrical connection between an external source of power and a motor within the housing, wherein the hermetic terminal includes a cup-shaped body member having a bottom wall through which a plurality of spaced conductor pins extend and a generally cylindrical side wall extending upwardly from the bottom wall toward the interior of the housing, a terminal block assembly for engagement with said hermetic terminal, comprising:
a main body member including an axially extending cylindrical shield portion having a generally cylindrical shield wall which is closed at one end thereof by a barrier wall having an inside surface facing the interior of said shield wall and an outside surface, and an elongate channel portion having a bottom channel wall at least partially comprising said outside surface of said barrier wall and a pair of channel outer walls extending upwardly therefrom to form a channel having a channel opening that opens upwardly from said outside surface, said open end of said cylindrical shield portion having an outwardly facing cylindrical surface adapted to sealingly engage an inwardly facing cylindrical surface of said side wall of the cup-shaped body member to establish an annular sealing interface therebetween;
a cover member adapted to selectively engage said pair of channel outer walls to cover said channel opening, said channel portion and said cover member defining a substantially closed terminal connector chamber; and
a plurality of terminal connector clips corresponding to said plurality of conductor pins, each connector clip being adapted to be connected to a respective conductor pin within said terminal connector chamber.

16. The terminal block assembly of claim 15 in which:
said cover member is slidingly engaged with said pair of channel walls such that said cover member is slidable in the axial direction of said channel portion; and
said cover member includes means for preventing axial movement of said cover member relative to said pair of channel walls once said cover member is in registry with said channel opening to cover same.

17. The terminal block assembly of claim 15 in which:
said barrier wall includes a plurality of apertures corresponding to said plurality of conductor pins, each one of said plurality of conductor pins passing through a respective one of said plurality of apertures and extending outwardly from said outside surface of said barrier wall into said terminal connector chamber, said plurality of terminal connector clips being in registry with said plurality of apertures, respectively; and
said cover member includes respective means engaging said plurality of terminal connector clips for preventing axial movement of said plurality of terminal connector clips out of registry with said plurality of apertures, respectively.

18. The terminal block assembly of claim 15, wherein said plurality of terminal connector clips are connected to electrical lead wires from said motor, in which:

said channel portion extends transversely to the axis of said cylindrical shield portion and includes a distal end spaced from said cylindrical shield portion which has a wire opening through which the electrical lead wires extend along the axis of said channel portion.

19. The terminal block assembly of claim 18 in which: said wire opening comprises means, including respective portions of said cover member and said channel portion, for substantially sealing around the individual electrical lead wires from said motor, whereby said terminal connector chamber remains substantially closed.

20. The terminal block assembly of claim 15 in which: said elongate channel portion includes a plurality of axially extending partition walls intermediate said channel outer walls, said channel being partitioned into a plurality of partitioned channels corresponding to said plurality of conductor pins, whereby a respective terminal connector clip is disposed within a respective partitioned channel and is connected to a respective conductor pin.

* * * * *